United States Patent
Watts et al.

(10) Patent No.: US 6,324,694 B1
(45) Date of Patent: Nov. 27, 2001

(54) METHOD AND APPARATUS FOR PROVIDING SUBSIDIARY DATA SYNCHRONOUS TO PRIMARY CONTENT DATA

(75) Inventors: E. Michael Watts, Morgan Hill; Christopher D. Williams, Soquel; Jean M. Goldschmidt Iki, San Jose; Anthony A. Shah-Nazaroff, Santa Clara; David N. Hackson, Sunnyvale, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/924,538

(22) Filed: Sep. 5, 1997

Related U.S. Application Data

(60) Provisional application No. 60/024,704, filed on Sep. 6, 1996.

(51) Int. Cl.[7] .............................. H04N 5/445; H04N 7/16; G06F 3/00; G06F 13/00
(52) U.S. Cl. ................................ 725/32; 725/35; 725/48; 725/152
(58) Field of Search ..................................... 348/714, 715, 348/716, 717, 460, 461, 467, 468; 725/42, 40, 32, 34, 35, 36, 151, 152; H04N 9/64, 7/00, 11/00, 5/445, 7/16; G06F 3/00, 13/00

(56) References Cited

U.S. PATENT DOCUMENTS

| | | |
|---|---|---|
| 4,694,490 * | 9/1987 | Harvey et al. ............................ 348/6 |
| 4,706,121 | 11/1987 | Young . |
| 4,751,578 | 6/1988 | Reiter et al. . |
| 5,220,420 | 6/1993 | Hoarty et al. . |
| 5,481,294 | 1/1996 | Thomas et al. . |
| 5,523,794 * | 6/1996 | Mankovitz et al. .................. 348/460 |
| 5,534,911 | 7/1996 | Levitan . |
| 5,541,662 | 7/1996 | Adams et al. . |
| 5,550,576 | 8/1996 | Klosterman . |
| 5,564,088 | 10/1996 | Saitoh . |
| 5,583,560 | 12/1996 | Florin et al. . |
| 5,585,865 | 12/1996 | Amano et al. . |
| 5,694,163 | 12/1997 | Harrison . |
| 5,699,124 * | 12/1997 | Nuber et al. .......................... 348/465 |
| 5,715,515 * | 2/1998 | Akins, III et al. ..................... 348/10 |
| 5,774,664 * | 6/1998 | Hidary et al. .......................... 348/12 |
| 5,818,441 * | 10/1998 | Throckmorton et al. ............ 345/328 |
| 5,897,623 * | 4/1999 | Fein et al. .............................. 705/27 |

OTHER PUBLICATIONS

PCT International Application No. PCT/US93/02861, International Publication No. WO 93/19427, International Publication Date of Sep. 30, 1993.

* cited by examiner

*Primary Examiner*—Andrew Faile
*Assistant Examiner*—Vivek Srivastava
(74) *Attorney, Agent, or Firm*—Blakely, Sokoloff, Taylor & Zafman LLP

(57) ABSTRACT

Primary content data is received from an external source and subsidiary data is obtained which corresponds to the primary content data, wherein the subsidiary data is independent of the primary content data. The subsidiary data is provided synchronous to the primary content data.

33 Claims, 6 Drawing Sheets

| PORTION (1) IDENTIFIER 211 | |
|---|---|
| TIME PERIOD (1) 212 | DATA PIECE (1) 217 |
| TIME PERIOD (2) 213 | DATA PIECE (2) 218 |
| ⋮ | ⋮ |
| TIME PERIOD (N) 214 | DATA PIECE (N) 219 |
| ⋮ | ⋮ |
| PORTION (X) IDENTIFIER 221 | |
| TIME PERIOD (1) 222 | DATA PIECE (1) 227 |
| ⋮ | ⋮ |
| TIME PERIOD (M) 223 | DATA PIECE (M) 228 |

PORTION (1) 202

PORTION (X) 204

*FIG. 2*

METHOD AND APPARATUS FOR PROVIDING SUBSIDIARY DATA SYNCHRONOUS TO PRIMARY CONTENT DATA

RELATED APPLICATIONS

This non-provisional application claims priority to Provisional Application No. 60/024,704 to Goldschmidt et al., for "System for Presenting 'Extracast' Information for Supplementing the Information Provided in a Broadcast Signal" filed on Sep. 6, 1996, which is assigned to the assignee of the present application.

BACKGROUND OF THE INVENTION

1 Field of the invention

The present invention pertains to the display and playback of video and/or audio data. More particularly, this invention relates to providing subsidiary data synchronous to primary content data.

2 Background

A recent trend in the electronics and computer industry is the convergence of computer systems and more traditional entertainment system components. Such convergence allows an increasingly broad range of information to be made available for system users over and above the broadcast television programming which has long been provided via conventional televisions.

One method of providing additional information to users to supplement the viewing of a television program is to provide additional information during the vertical blanking interval (VBI) of the program. However, this method limits the user to receiving information only during the program and only while tuned to the appropriate channel. Changing the channel during the program or temporarily turning off the television during part of the program can result in the loss of part of the additional information. Furthermore, the amount of data which can be transferred during the VBI of a program is limited due to the relatively small bandwidth of the VBI. Thus, it would be beneficial to provide a more robust way to provide additional information to supplement the viewing of television programming.

Therefore, a need exists for a method and apparatus for more effective provision of subsidiary data to supplement primary content data.

SUMMARY OF THE INVENTION

According to one embodiment of the present invention, primary content data is received from an external source and subsidiary data is obtained which corresponds to the primary data, wherein the subsidiary data is independent of the primary content data. The subsidiary data is provided synchronous to the primary data.

BRIEF DESCRIPTION OF THE DRAWINGS

The present invention is illustrated by way of example and not limitation in the figures of the accompanying drawings, in which like references indicate similar elements and in which:

FIG. 2 is a diagram illustrating a data structure storing multiple portions of subsidiary data according to one embodiment of the present invention;

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
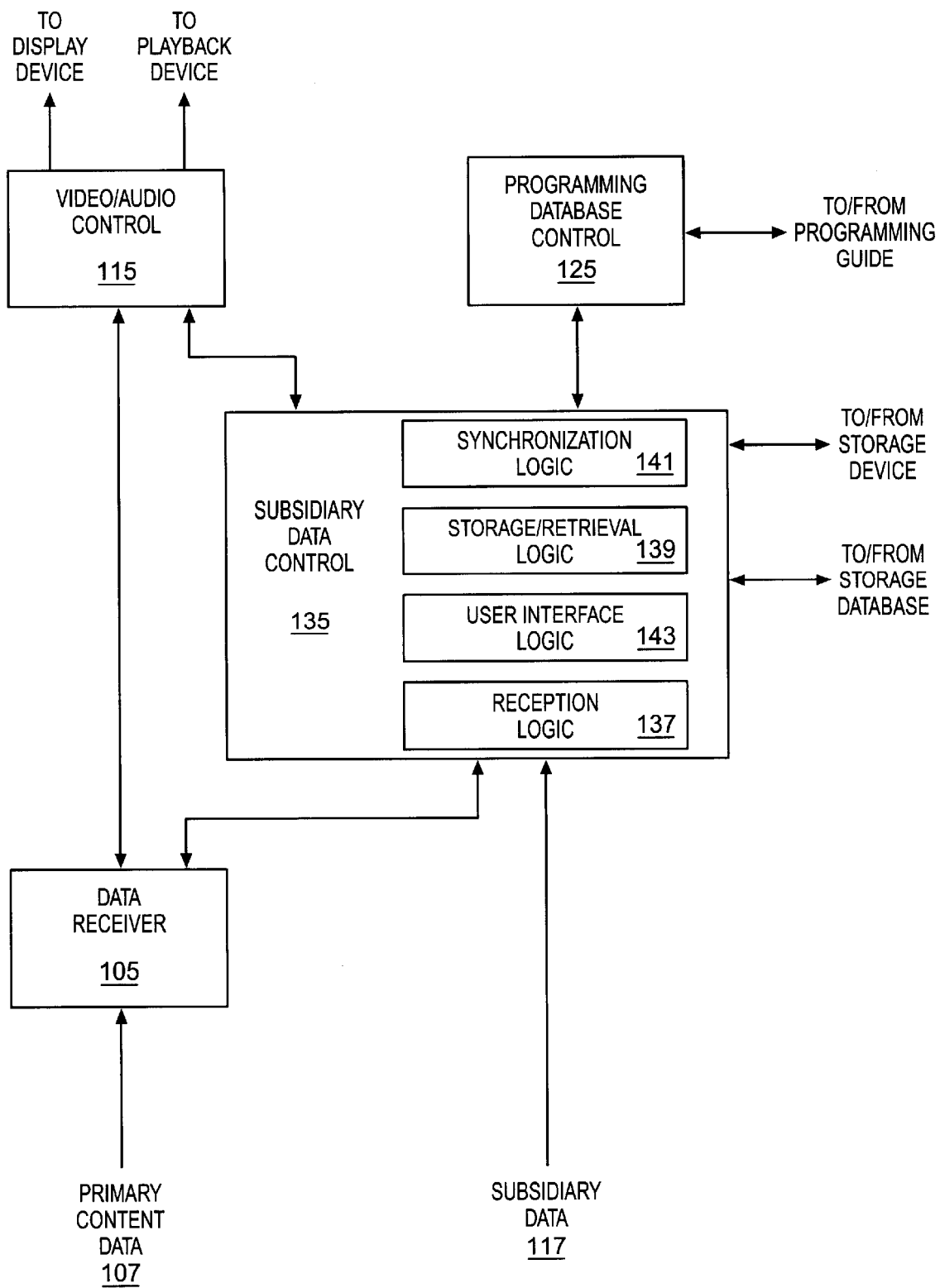
FIG. 1 is a block diagram illustrating a system architecture for providing subsidiary data complementary to primary content data according to one embodiment of the present invention.

FIG. 1 is a block diagram illustrating a system architecture for providing subsidiary data complementary to primary content data according to one embodiment of the present invention. The system architecture includes primary data receiver 105, video/audio control 115, programming database control 125, and subsidiary data control 135 coupled together as illustrated. Data receiver 105 receives primary content data 107 from an external source (not shown), while subsidiary data control 135 receives subsidiary data 117 from another external source (not shown).

Data receiver 105 is communicatively coupled to subsidiary data control 135 and to video/audio control 115. In the illustrated embodiment, data receiver 105 can receive primary content data 107 from any of a wide range of external sources, including cable television providers, digital satellite system providers, traditional analog television providers, digital cable providers, digital broadcast providers, video cassettes, digital video disks, etc. Another possible source is a programming provider which provides Internet broadcasts of video and/or audio data via the Internet. It is also to be appreciated that primary content data 107 can be provided to data receiver 105 using any of a wide range of conventional mediums, including both wireless (e.g., radio frequency) and wired (e.g., cable), and can be received directly (e.g., using a satellite dish), or indirectly (e.g., via a network such as the Internet or a local area network). Data receiver 105 identifies to subsidiary data control 135 from which one of multiple external sources data receiver 105 is receiving data. This identification includes both the source as well as the channel of the source (if appropriate) to which data receiver 105 is currently "tuned".

In one embodiment of the present invention, primary content data 107 is television programming content data. In alternate embodiments, primary content data 107 is another non-television programming type of video and/or audio data.

In one embodiment, data receiver 105 receives primary content data 107 via a television tuner board or card, such as either the VIDEO RAGE or VIDEO RAGE II graphics cards available from STB Systems, Inc. of Richardson, Tex. In another embodiment, data receiver 105 receives primary content data 107 via a digital video broadcast (DVB) receiver card. However, in alternate embodiments other conventional television tuner boards or devices can be used. The operation of such tuner boards and devices is well-known to those skilled in the art and thus will not be discussed further except as it pertains to the present invention.

Whatever the source, primary content data 107 includes video and/or audio data which data receiver 105 provides to video/audio control 115. In one embodiment of the present invention, data receiver 105 digitizes primary content data 107 and provides the digital representation of the primary content data 107 to video/audio control 115. In alternate embodiments where primary content data 107 is already in digital form, or where video/audio control 115 expects data in analog form, such digitization is not necessary. Video/audio control 115 forwards the video portion of the data to a display device for display to a user and the audio portion of the data to a playback device for playing to the user.

Video/audio control 115 can also receive subsidiary data from subsidiary data control 135. This subsidiary data is intended to supplement the primary content data 107 and provide additional information to the user, typically information which is complementary to primary content data 107. This subsidiary data is received by subsidiary data control 135 as subsidiary data 117, and, as discussed in more detail below, is either stored for later use or passed through to video/audio control 115.

Video/audio control 115 combines the primary content data with the subsidiary data and forwards the combined data to the display and audio devices. It is to be appreciated that additional components (not shown in FIG. 1) may be situated between video/audio control 115 and the display and playback devices, such as a display adapter having video memory which stores the data prior to providing the data to the display device. Video/audio control 115 separates the display into multiple sections, at least one of which is used to display the video of the primary content data and at least one other of which is used to display the video of the subsidiary data The combining of two different video sources for concurrent display is well-known to those skilled in the art and thus will not be discussed further except as it pertains to the present invention.

It is to be appreciated that video/audio control 115 can separate the display into multiple sections in any of a wide variety of formats. Examples of such separation formats include, but are not limited to, the following: top and bottom of either equal or unequal sizes, left and right of either equal or unequal sizes, border and center, and one window within another (e.g., using a picture-in-picture type format). In the illustrated embodiment, subsidiary data 117 indicates how video/audio control 115 is to separate the display. Alternatively, how the display is to be separated can be pre-programmed into video/audio control 115 or subsidiary data control 135.

Video/audio control 115 also combines the audio data from the primary content data with the audio data from the subsidiary data and forwards the combined audio data to the playback device. The combining of two different audio sources for concurrent playback is well-known to those skilled in the art and thus will not be discussed further except as it pertains to the present invention.

In the illustrated embodiment, subsidiary data 117, also referred to as "extracast" information or data, comprises additional multimedia data which is designed to supplement one or more programs from primary content data 107. Examples of such additional multimedia data include reference information regarding the programs, additional biographical information regarding the actors, guests, or participants of a program, advertisements, etc. In one implementation, subsidiary data 117 includes multiple HyperText Markup Language (HTML) documents.

The source of subsidiary data 117 can be any of a wide range of data sources. Examples of such sources include, but are not limited to, the sources of primary content data 107. Additional examples of such sources include file servers accessed via a dial-up connection or network (such as a local area network or the Internet) and volatile or nonvolatile storage devices such as magnetic diskettes or CD-ROMs. In the illustrated embodiment subsidiary data 117 is independent of primary content data 107. The receipt of primary content data 107 and subsidiary data 117 are independent of each other. Thus, a portion of subsidiary data 117 corresponding to a particular program can be received in advance of that particular program. In one implementation, subsidiary data 117 corresponding to a particular program is received during the vertical blanking intervals (VBIs) of one or more predecessor programs.

Subsidiary data control 135 includes reception logic 137, storage/retrieval logic 139, synchronization logic 141, and user interface logic 143. Reception logic 137 controls reception of subsidiary data 117 from an external source and provides subsidiary data 117 to either storage/retrieval logic 139 or synchronization logic 141. Subsidiary data 117 includes one or more portions each of which corresponds to one or more programs which can be received as primary content data 107 by data receiver 105. In one embodiment, each portion of subsidiary data 117 includes an identifier indicating to which program(s) of primary content data 107 the particular portion corresponds.

According to one mode of operation, reception logic 137 provides received subsidiary data 117 to storage/retrieval logic 139, which in turn stores the received subsidiary data to a local long-term storage device for subsequent retrieval. In the illustrated embodiment, storage/retrieval logic 139 also maintains a storage database which identifies each portion of subsidiary data available to subsidiary data control 135 as well as an identifier indicating to which program each portion corresponds. Thus, by accessing the storage database, subsidiary data control 135 can readily determine which portion of subsidiary data, if any, corresponds to any given program. The storage database could identify subsidiary data for all of primary content data 107, or alternatively only that subsidiary data which is stored in the local long-term storage device. In another alternate embodiment, rather than maintaining a separate storage database, an identifier of the portion of subsidiary data to be provided is stored in a programming guide. Thus, the portion is immediately identified by storage/retrieval logic 139 using this identifier rather than requiring an additional lookup in the storage database. This mode of operation may be used for example in situations where the portion of subsidiary data 117 which corresponds to a program of primary content data 107 is received prior to reception of the program, or situations where the user desires long-term storage of the portion of subsidiary data 117, such as for future use.

In another mode of operation, subsidiary data control 135 forwards the subsidiary data directly to the display device upon receipt. In this mode of operation, reception logic 137 provides received subsidiary data 117 to synchronization logic 141, which in turn synchronizes subsidiary data 117 to primary content data 107. It is to be appreciated that subsidiary data 117 may be stored temporarily in system memory during this reception and synchronization process. This mode of operation may be used for example in situations where the portion of subsidiary data 117 corresponding to a currently received program of primary content data 107 is being received approximately concurrently with reception of the program.

In the illustrated embodiment of the present invention, if the desired subsidiary data is not available in the local storage device, then storage/retrieval logic 139 forwards the request to reception logic 137. In this situation, reception logic 137 accesses a remote location, such as a remote server, to obtain the desired subsidiary data In one implementation, the identity of the remote location for such subsidiary data is preprogrammed into reception logic 137. In other implementations, the identity of the remote location is stored in the programming guide, discussed below, or alternatively received as part of primary content data 107.

According to one embodiment of the present invention, accesses to a remote server, or other remote location, to obtain the subsidiary data are monitored by the remote server. In this embodiment, the remote server can then charge users a fee for accessing the subsidiary data on the remote server. The amount of such charges could be based on an access time basis, subject matter basis, amount of data retrieved basis, etc. Such fees could be collected in any of a wide range of manners, including bills, charges to a credit card, applying to a credit account maintained at the remote server, etc.

When enabled, synchronization logic 141 controls synchronization of subsidiary data 117 to primary content data 107. In the illustrated embodiment, data receiver 105 notifies subsidiary data control 135 of any changes in the channel and/or source of primary content data to which the television tuner board coupled to data receiver 105 is currently "tuned". In an alternate embodiment, subsidiary data control 135 repeatedly inquiries data receiver 105 as to which channel the television tuner board is currently "tuned", thereby alleviating receiver 105 and/or the television tuner board of the burden of detecting and notifying a channel and/or source change to control 135. In another alternate embodiment, an additional agent (not shown) controls the television tuner board to "tune" to a particular channel and/or source, and this additional agent also notifies subsidiary data control 135 of the current channel and/or source to which the television tuner board is currently "tuned".

Based on the channel and source to which the television tuner board, and thus data receiver 105, is "tuned", synchronization logic 141 inquiries programming database control 125 as to the identity of the program being received from the identified channel/source combination. Programming database control 125 is coupled to a programming guide corresponding to primary content data 107. The programming guide provides programming information corresponding to various media (cable, RF broadcast, satellite, audio programming, Internet programming, etc.), channels available in each medium, and program time slots. This information is available for each day of the week (Sunday–Saturday), and for each day of the month (1–31), as appropriate. In one implementation, the programming guide includes a listing for each channel of each source of primary content data 107. Additional information can also be stored for the various programs in the programming guide. Examples of such additional information include: an identifier of a portion of subsidiary data, a location of the portion of subsidiary data, the length of the program, a program description/synopsis, actors/actresses, director, date of first airing or release, program genre, channel callsign, rating, critique, etc. In one implementation, the programming guide is updated periodically by accessing a remote server (not shown) via a telephone or network connection or via other mediums such as distributed diskettes or CD-ROMs, a VBI of a television signal, or an additional data stream corresponding to a digital video signal (e.g., from a satellite system).

In alternate embodiments of the present invention, the identity of the program being received as primary content data 107 at any given moment can be ascertained without the use of the programming guide. Such additional embodiments include, but are not limited to, additional databases or libraries of local sources such as video cassettes or digital video disks, and receiving an identifier from the program source itself (e.g., an identifier at the beginning of and perhaps periodically throughout the program).

According to one embodiment of the present invention, programming database control 125 makes the programming guide available for user access. In this embodiment, programming database control 125, or alternatively another component (not shown), provides an interface, such as a graphical user interface, which allows a user to interact with programming database control 125 and thereby access the contents of the programming guide.

Synchronization logic 141 accesses the current system time, such as from an internal clock (not shown), and forwards the channel, source, and current system time information to programmiing database control 125. Programming database control 125 uses this information to access the programming guide and obtain an identifier of the program corresponding to the channel, source, and current system time. The identifier of the program is then returned to synchronization logic 141.

Synchronization logic 141 forwards the identifier of the program to storage/retrieval logic 139, which accesses the storage database to determine whether any subsidiary data corresponds to the program. Storage/retrieval logic 139 indicates to synchronization logic 141 whether such corresponding information exists. If no such corresponding information exists, then synchronization logic 141 does not provide any subsidiary data to accompany the primary content data. However, if such corresponding information exists, then synchronization logic 141 obtains and provides the appropriate pieces of the corresponding portion for concurrent display with the primary content data, as discussed in more detail below.

Each portion of subsidiary data stored in the storage device includes one or more corresponding time periods. Each of these time periods identifies a piece of the portion of subsidiary data which corresponds to a particular time in the program of the primary content data. These time periods are included as part of subsidiary data 117 received by subsidiary data control 135 and are used by synchronization logic 141 in obtaining the subsidiary data.

Synchronization logic 141 accesses the programming guide via programming database control 125 to identify the current temporal position in the program. In other words, the programming guide identifies the time at which the current program started and, based on the current system time, synchronization logic 141 calculates the elapsed time of the program. Using the elapsed time of the program and the time period of the portion of subsidiary data 117, synchronization logic 141 identifies which piece of the corresponding subsidiary data 117 portion is to be provided via the display device. Thus, it can be said that the display of the subsidiary data is synchronized to the display of the primary content data According to another embodiment of the present invention, rather than including multiple time periods, each piece of a portion of subsidiary data includes a particular "tag value" or identifier. In this embodiment, primary content data 107 includes a tag value or identifier identifying which piece of subsidiary data is currently to be provided with the program of primary content data 107. In one implementation, this tag value or identifier is transmitted during the vertical blanking interval for primary content data 107. In response to the received tag value, data receiver 105 transmits the tag value or identifier to synchronization logic 141 of subsidiary data control 135 for synchronizing the identified piece of subsidiary data to the program. Thus, in this embodiment, the tag values received as part of primary content data 107 indicate the elapsed time of the program.

FIG. 2 is a diagram illustrating a data structure storing multiple portions of subsidiary data according to one embodiment of the present invention. FIG. 2 illustrates multiple (X) portions 202 and 204, each including a portion identifier, multiple time periods and corresponding data pieces. As illustrated, portion 202 includes a portion identifier 211, multiple (N) time period identifiers 212, 213, and 214, and multiple (N) corresponding data pieces 217, 218, and 219, respectively. Similarly, portion 204 includes portion identifier 221, multiple (M) time period identifiers 222 and 223, and multiple (M) corresponding data pieces 227 and 228, respectively.

In alternate embodiments, data structure 200 includes a portion for only one program rather than multiple programs. In other alternate embodiments, certain portions include only a single time period and corresponding data piece.

Returning to FIG. 1, subsidiary data control 135 also includes user interface logic 143. User interface logic 143 provides an interface, such as a graphical user interface (GUI), to users of the system which allows the users to interact with storage/retrieval logic 139. User interface logic 143 provides a user with prompts which allow the user to enter search terms to search the storage database. According to one embodiment, user interface logic 143 also provides a user with prompts which allow the user to identify a particular portion of subsidiary data and view the data independent of the receipt of the corresponding program via primary content data 107. By way of example, using interface logic 143, a user is able to view the subsidiary data prior to or subsequent to the receipt of the corresponding program.

In an alternate embodiment of the present invention, user interface logic 143 is an interface which provides other applications with access to storage/retrieval logic 139 and thus the stored subsidiary data. In one such alternate embodiment, user interface logic 143 is an Application Programming Interface (API) which can be accessed by other applications. In another such alternate embodiment, user interface logic 143 instructs another interface unit (not shown) to display the subsidiary data.

In one embodiment of the present invention, synchronization logic 141 can be enabled and disabled by a user. In one implementation, this enablement option is made available to the user via an on-screen programming guide. As discussed above, a user is able to access the programming guide via programming database control 125 for information on the programs available in primary content data 107. In this implementation, an additional user-selectable icon is provided to the user which allows the user to toggle enablement of subsidiary data When selected by a user, programming database control 125 notifies synchronization logic 141 of whether subsidiary data provision has been enabled or disabled.

In an alternate embodiment of the present invention, synchronization logic 141 is coupled to a database which cross-references channel, source, and time combinations to subsidiary data. Thus, in this alternate embodiment, each portion of subsidiary data is identified according to a channel and source combination rather than a program name.

In an alternate embodiment of the present invention, data receiver 105 and video/audio control 115 are both implemented on the television tuner board. Thus, in this embodiment, subsidiary data control 135 receives an indication of the current source and channel, as appropriate, of primary content data 107 and in response forwards the corresponding subsidiary data to the tuner board.

In the discussions above, reference is made to the use of a single tuner board. However, in alternate embodiments multiple tuner boards, or multiple sets of "tuning" logic on a single board, of the same or different types can be used concurrently with the present invention. Thus, in these alternate embodiments, multiple programs of primary content data 107 can be "tuned" simultaneously and either selectively or concurrently provided to video/audio control 115.

Figure 3:
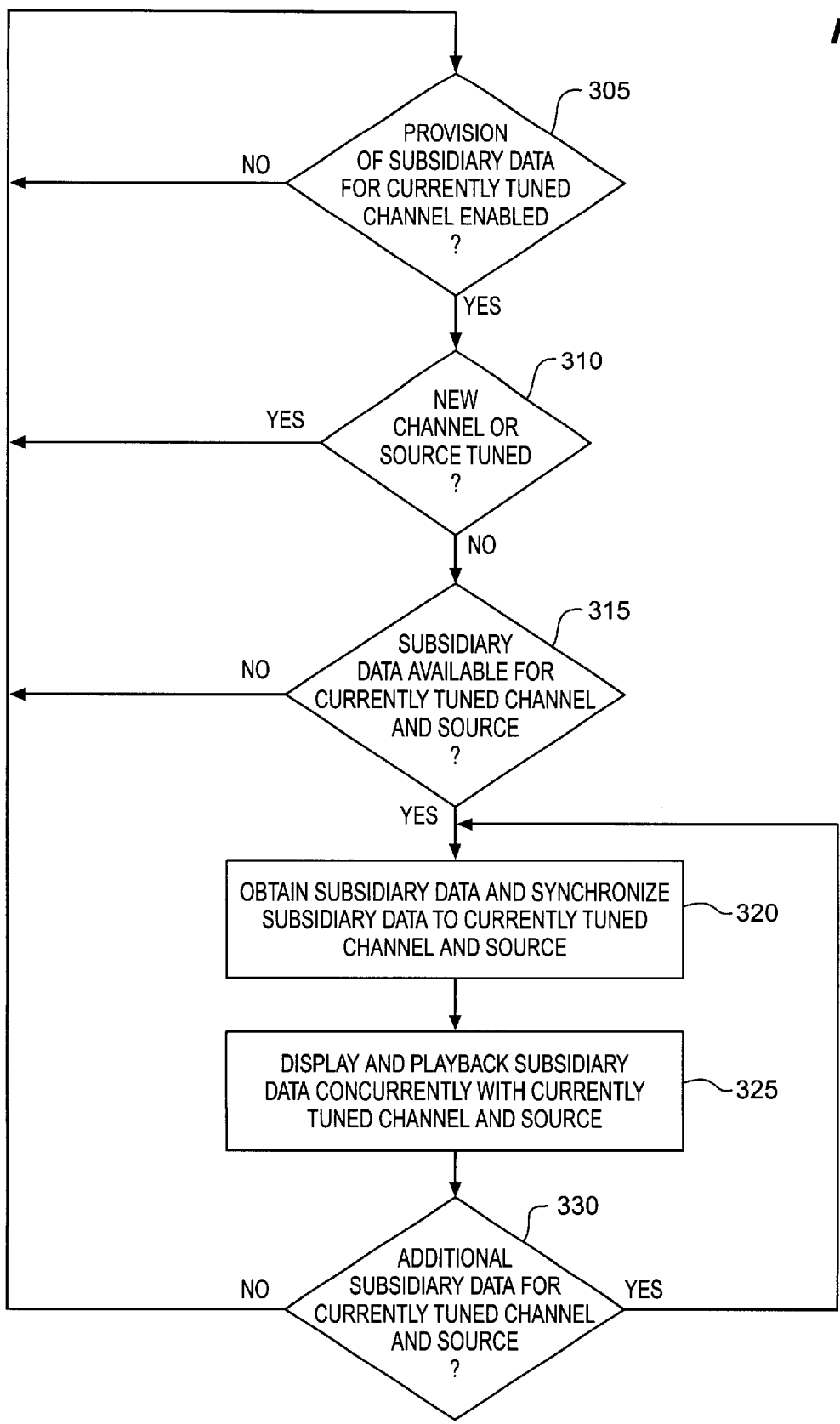
FIG. 3 is a flowchart illustrating the steps followed in providing subsidiary data to supplement primary content data according to one embodiment of the present invention.

FIG. 3 is a flowchart illustrating the steps followed in providing subsidiary data to supplement primary content data according to one embodiment of the present invention. Synchronization logic 141 first checks whether provision of subsidiary data for the currently "tuned" channel is enabled, step 305. If provision of subsidiary data is not enabled, then synchronization logic 141 repeats step 305 until provision of subsidiary data is enabled. However, if display of subsidiary data is enabled, then synchronization logic 141 checks whether a new channel or source has been "tuned", step 310. If a new channel or source has been "tuned", then synchronization logic 141 returns to step 305 to check whether provision of subsidiary data for the newly "tuned" channel is enabled. However, if a new channel or source has not been "tuned", then synchronization logic 141 checks whether subsidiary data is available for the currently "tuned" channel and source, step 315. As discussed above, the subsidiary data could be available either locally or remotely. If subsidiary data is not available, then synchronization logic 141 returns to step 305.

However, if subsidiary data is available, synchronization logic 141 obtains the subsidiary data and synchronizes the subsidiary data to the currently "tuned" channel and source, step 320. Synchronization logic 141 then displays and plays back a piece of the synchronized subsidiary data via the display and playback devices concurrently with the currently "tuned" channel and source, step 325. Synchronization logic 141 then checks whether additional pieces of subsidiary data for the currently "tuned" channel and source are available, step 330. If so, then these additional pieces are also displayed and played back. However, if there is no additional subsidiary data for the currently "tuned" channel, then synchronization logic 141 returns to step 305 to await enablement for a newly "tuned" channel or source.

It should be noted that synchronization logic 141 can interrupt the checking, synchronization, and display and playback steps 315, 320, 325, and 330 at any time. Such interrupting is done, for example, in response to a change in the currently "tuned" channel or source, after which synchronization logic 141 returns to step 305.

In one embodiment of the present invention, step 315 is optional. In this embodiment, display and playback of subsidiary data can be enabled only for those programs which have corresponding subsidiary data. Thus, there is no need to perform the dual check of steps 305 and 315.

In another embodiment of the present invention, step 305 is optional. In this embodiment, subsidiary data control 135 only activates synchronization logic 141 when display of subsidiary data is enabled. Furthermore, once display of subsidiary data is disabled, subsidiary data control 135 deactivates synchronization logic 141. Thus, no repeated checking of whether subsidiary data display is enabled is necessary.

Figure 4:
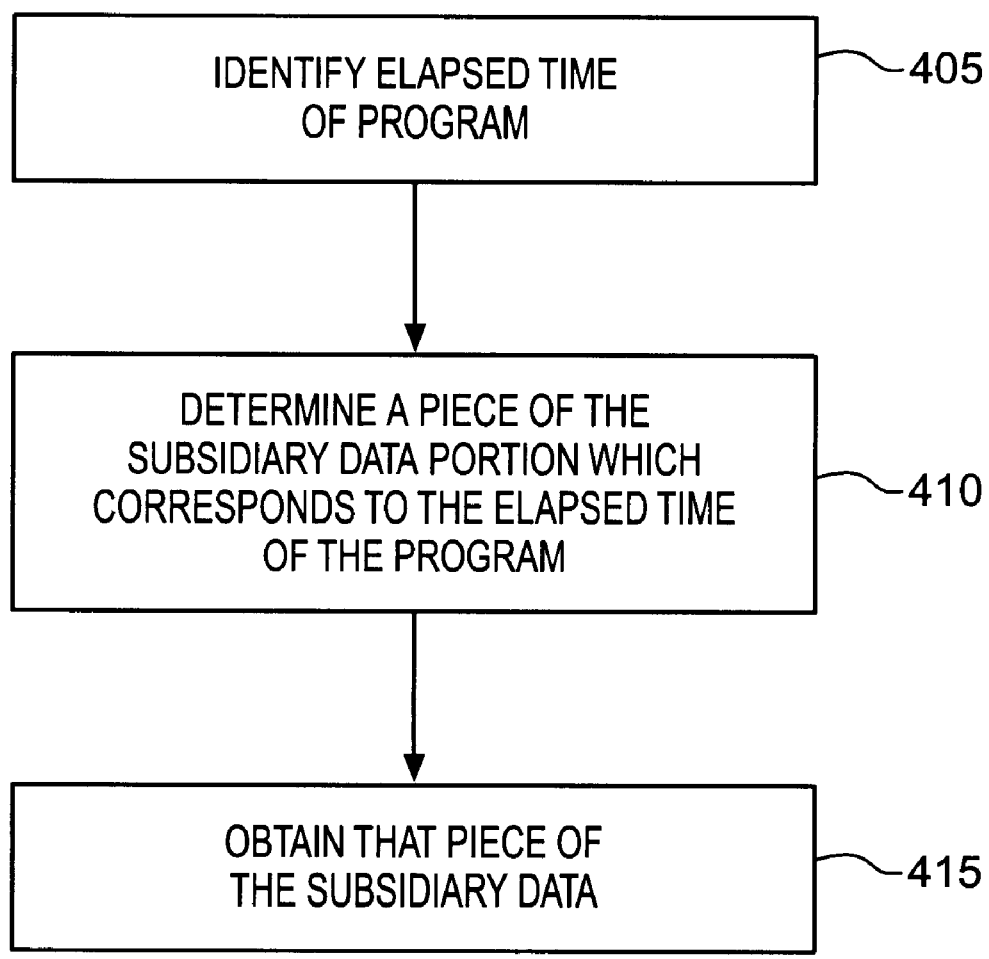
FIG. 4 is a flowchart illustrating the steps followed in synchronizing subsidiary data to primary content data according to one embodiment of the present invention.

FIG. 4 is a flowchart illustrating the steps followed in synchronizing subsidiary data to primary content data according to one embodiment of the present invention. Initially, synchronization logic 141 identifies the elapsed time of the program, step 405. Then, synchronization logic 141 determines a piece of the subsidiary data portion corresponding to the program with a time period corresponding to the elapsed time of the program, step 410. Synchronization logic 141 then obtains that piece of the subsidiary data for provision to the user, step 415.

Figure 5:
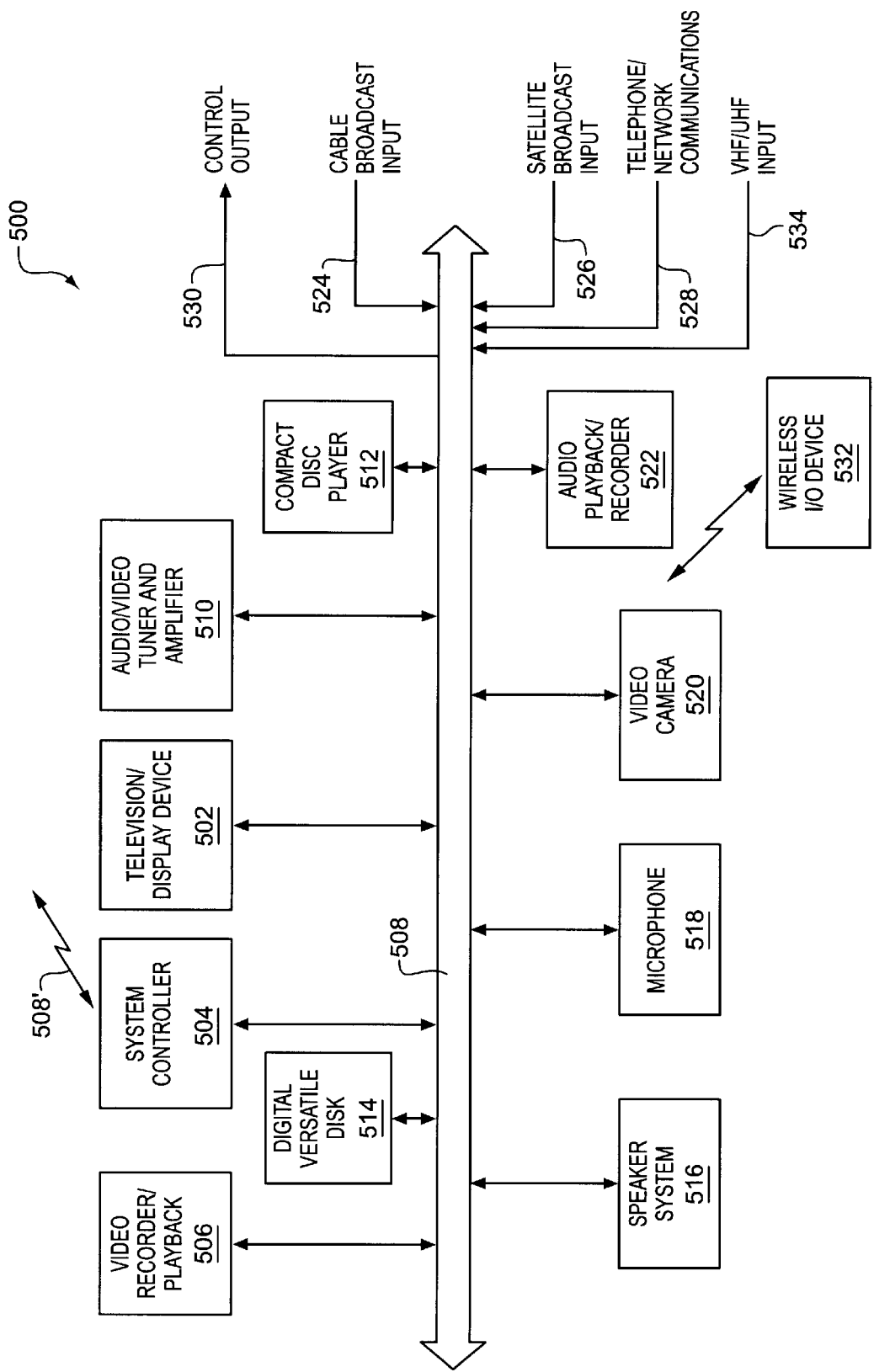
FIG. 5 is a block diagram illustrating the system components of one embodiment of an entertainment system in which the present invention may be practiced.

FIG. 5 is a block diagram illustrating the system components of one embodiment of an entertainment system in which the present invention may be practiced. As will be discussed in greater detail below, system 500 includes system controller or machine 504 which, in one embodiment, is configured to store a programming guide and subsidiary data. System 500 may also be referred to as a "convergence system" designed to integrate the world of entertainment systems and computing platforms. In one embodiment, system controller 504 is a computer system incorporated with the teachings of the present invention, as will be discussed in further detail below. In another embodiment, system controller 504 is a "set-top" box endowed with the necessary processing power and incorporated with the teachings of the present invention.

As shown, FIG. 5 illustrates but one example of an entertainment system incorporated with the teachings of the present invention. In the illustrated embodiment, system 500 includes television/monitor 502, video recorder/playback device 506, digital video disk (referred to as "DVD", which is currently used as an acronym for digital video disk, although it appears that the usage is being changed to digital versatile disk to reflect the use of DVD technology for data other than video) recorder/playback device 514, audio/video tuner and amplifier 510, audio playback/recorder device 522 and compact disc player 512, all coupled to a common input/output (I/O) bus 508. It is to be appreciated that the use of the common I/O bus 508 is for ease of explanation in the diagram only, and that a number of alternative means of routing input and output signals may be beneficially employed. For example, audio input and output could be routed with an appropriate number of independent audio "patch" cables, video signals may be routedwith independent coaxial cable, and control signals may be routed along a two-wire serial line, or through infrared (IR) communication signals or radio frequency (RF) communication signals. It is also to be appreciated that video recorder/playback device 506, DVD 514, audio playback/recorder device 522, and compact disc player 512 can be single-disk or single-cassette device, or alternatively can be multiple-disk or multiple-cassette devices.

In addition, system 500 includes speaker system 516, microphone 518, video camera 520 and a wireless input/output (I/O) control device 532. In one embodiment, wireless I/O control device 532 is an entertainment system remote control unit which communicates with the components of system 500 through IR signals. In another embodiment, wireless I/O control device 532 may be a wireless keyboard and cursor positioning device that communicates with the components of system 500 through IR signals or RF signals. In yet another embodiment, wireless I/O control device 532 may be an I/R remote control device similar in appearance to a typical entertainment system remote control with the added feature of a track-ball, which allows a user to position a cursor on a display of system 500.

At the core of the system is system controller 504 incorporated with the features of the present invention, configured to control a wide variety of features associated with each of the system components. As depicted, system controller 504 is coupled, either directly or indirectly, to each of the system components, as necessary, through I/O bus 508. In one embodiment, in addition to or in place of I/O bus 508, system controller 504 is configured with a wireless communications transmitter (or transceiver), which is capable of communicating with the system components via IR signals or RF signals 508'. Regardless of the control medium, system controller 504 is configured to control one or more of the entertainment system components of system 500, although it is understood that each of the components may be individually controlled with wireless I/O device 532.

As illustrated in FIG. 5, system 500 can be configured to receive primary content data and subsidiary data from a wide variety of sources. In one embodiment, for example, system 500 receives primary content data and subsidiary data from any or all of the following sources: cable broadcast 524, satellite broadcast 526 (e.g., via a satellite dish), very high frequency (VHF) or ultra high frequency (UHF) radio frequency communication of the broadcast networks 534 (e.g., via an aerial antenna), telephone/computer network interface 528, video recorder/playback device 506, DVD 514, and/or information stored locally at system controller 504 or another component of system 500. Further, it will be appreciated by one skilled in the art, that cable broadcast input 524, satellite broadcast input 526 and VHF/UHF input 534 may beneficially receive input from digital broadcast programming and digital cable programming.

Except for the incorporated teachings of the present invention (described above), system controller 504 is intended to represent a broad category of "computing" devices known in the art. Examples of such "computing" devices include conventional desktop computers as well as Internet "appliance" devices, such as a WebTV™ Internet Terminal available from Sony Electronics Inc. of Park Ridge, N.J., or Philips Consumer Electronics Company of Knoxville, Tenn. A number of audio and video input and output peripherals/interfaces for receiving, digitizing and compressing audio and video signals are also known in the art. It is to be appreciated that the housing size and design for system controller 504 may be altered, allowing it to better visually fit into system 500.

It is also to be appreciated that the several entertainment system components depicted in FIG. 5 can be beneficially combined. By way of example, system controller 504 could be integrated into television/monitor 502, DVD 514, or audio/video tuner and amplifier 510.

Figure 6:
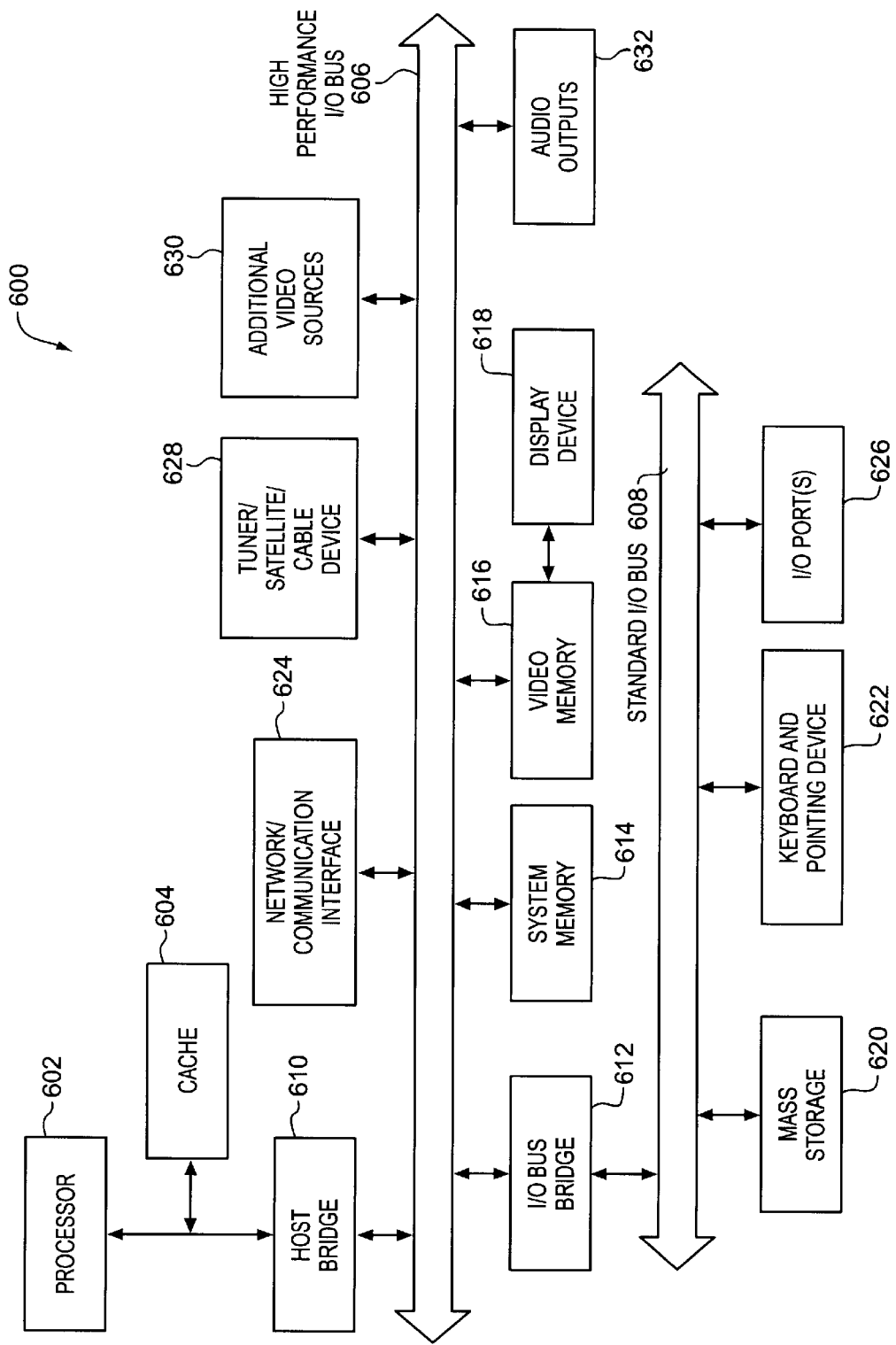
FIG. 6 illustrates another embodiment of a hardware system suitable for use with the present invention.

FIG. 6 illustrates another embodiment of a hardware system suitable for use with the present invention. In the illustrated embodiment, hardware system 600 includes processor 602 and cache memory 604 coupled to each other as shown. Additionally, hardware system 600 includes high performance input/output I/O bus 606 and standard I/O bus 608. Host bridge 610 couples processor 602 to high performance I/O bus 606, whereas I/O bus bridge 612 couples the two buses 606 and 608 to each other. Coupled to bus 606 are network/communication interface 624, system memory 614, and video memory 616. In turn, display device 618 is coupled to video memory 616. Coupled to bus 608 is mass storage 620, keyboard and pointing device 622, and I/O ports 626. Collectively, these elements are intended to represent a broad category of hardware systems, including but not limited to general purpose computer systems based on the Pentium® processor, Pentium® Pro processor, or Pentium® II processor, manufactured by Intel Corporation of Santa Clara, Calif.

In one embodiment, various electronic devices are also coupled to high performance I/O bus 606. As illustrated, analog tuner/digital satellite/cable devices 628, additional video sources 630, and audio outputs 632 are also coupled to high performance I/O bus 606.

These elements 602–632 perform their conventional functions known in the art. In particular, network/communication interface 624 is used to provide communication between system 600 and any of a wide range of conventional networks, such as an Ethernet, token ring, the Internet, etc. It is to be appreciated that the circuitry of interface 624 is dependent on the type of network the system 600 is being coupled to.

Mass storage 620 is used to provide permanent storage for the data and programming instructions to implement the above described functions, whereas system memory 614 is used to provide temporary storage for the data and programming instructions when executed by processor 602. I/O ports 626 are one or more serial and/or parallel communication ports used to provide communication between additional peripheral devices which may be coupled to hardware system 600.

It is to be appreciated that various components of hardware system 600 may be re-arranged. For example, cache 604 may be on-chip with processor 602. Alternatively, cache 604 and processor 602 may be packed together as a "processor module", with processor 602 being referred to as the "processor core". Furthermore, certain implementations of the present invention may not require nor include all of the above components. For example, mass storage 620, keyboard and pointing device 622, and/or display device 618 and video memory 616 may not be included in system 600. Additionally, the peripheral devices shown coupled to standard I/O bus 608 may be coupled to high performance I/O bus 606; in addition, in some implementations only a single bus may exist with the components of hardware system 600 being coupled to the single bus. Furthermore, additional components may be included in system 600, such as additional processors, storage devices, or memories.

In one embodiment, the method and apparatus for providing subsidiary data synchronous to primary content data according to the present invention as discussed above is implemented as a series of software routines run by hardware system 600 of FIG. 6. In this embodiment, data receiver 105, video/audio control 115, programming database control 125, and subsidiary data control 135 of FIG. 1 are each implemented as a series of software routines. These software routines comprise a plurality or series of instructions to be executed by a processor in a hardware system, such as processor 602 of FIG. 6. Initially, the series of instructions are stored on a storage device, such as mass storage 620. It is to be appreciated that the series of instructions can be stored using any conventional storage medium, such as a diskette, CD-ROM, magnetic tape, DVD, laser disk, ROM, Flash memory, etc. It is also to be appreciated that the series of instructions need not be stored locally, and could be received from a remote storage device, such as a server on a network, via network/communication interface 624. The instructions are copied from the storage device, such as mass storage 620, into memory 614 and then accessed and executed by processor 602. In one implementation, these software routines are written in the C++ programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with the above described functions of the present invention. By way of another example, data receiver 105, video/audio control 115, programming database control 125, and subsidiary data control 135 of FIG. 1 could be implemented in one or more ASICs of an additional circuit board for insertion into hardware system 600 of FIG. 6.

Thus, a method and apparatus for providing subsidiary data synchronous to primary content data has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method comprising:
   receiving primary content data at an entertainment system from a primary external source;
   receiving subsidiary data at the entertainment system from a subsidiary external source, the subsidiary data being independent of and supplementing the primary content data;
   displaying the primary content data on a display device of the entertainment system;

determining the identity of the primary content data currently displayed by determining the time and channel corresponding to the primary content data currently displayed and accessing an electronic program guide using the determined time and channel;

determining whether subsidiary data supplementing the primary content data exists by accessing a storage database using the primary content data identity;

obtaining the subsidiary data identified in the storage database for display; and displaying the subsidiary data on the display device of the entertainment system.

2. The method of claim 1, further comprising:

receiving all of the subsidiary data corresponding to a program of the primary content data prior to beginning receipt of the program; and storing the subsidiary data corresponding to the program locally.

3. The method of claim 2, wherein obtaining subsidiary data comprises obtaining the subsidiary data from a local nonvolatile storage medium.

4. The method of claim 1, wherein the step of providing the subsidiary data comprises:

determining an elapsed time of a program of the primary content data;

identifying a portion of the subsidiary data which corresponds to the program;

identifying a piece of the portion of the subsidiary data which corresponds to the elapsed time of the program; and providing the piece concurrently with the primary content data.

5. The method of claim 4, wherein identifying a portion of the subsidiary data comprises accessing a database which stores a plurality of portions of the subsidiary data.

6. The method of claim 1, wherein the primary content data comprises data of a television broadcast.

7. The method of claim 1, wherein the primary content data comprises data of a digital satellite broadcast.

8. The method of claim 1, wherein the primary content data comprises data of an Internet broadcast.

9. The method of claim 1, wherein the primary content data comprises data of an audio-only broadcast.

10. A machine-readable medium having stored thereon data representing sequences of instructions which, when executed by a machine, cause the machine to perform operations comprising:

receiving primary content data at an entertainment system from a primary external source;

receiving subsidiary data at the entertainment system from a subsidiary external source, the subsidiary data being independent of and supplementing the primary content data;

displaying the primary content data on a display device of the entertainment system;

determining the identity of the primary content data currently displayed by determining the time and channel corresponding to the primary content data currently displayed and accessing an electronic program guide using the determined time and channel;

determining whether subsidiary data supplementing the primary content data exists by accessing a storage database using the primary content data identity;

obtaining the subsidiary data identified in the storage database for display; and displaying the subsidiary data on the display device of the entertainment system.

11. The machine-readable medium of claim 10, wherein the instructions further comprise instructions causing the machine to perform operations comprising:

receiving all of the subsidiary data corresponding to a program of the primary content data prior to beginning receipt of the program; and storing the subsidiary data corresponding to the program locally.

12. The machine-readable medium of claim 11, wherein the instructions for obtaining subsidiary data comprises instructions causing the machine to perform operations comprising obtaining the subsidiary data from a local nonvolatile storage medium.

13. The machine-readable medium of claim 10, wherein the instructions for providing the subsidiary data further comprise instructions causing the machine to perform operations comprising:

determining an elapsed time of a program of the primary content data;

identifying a portion of the subsidiary data which corresponds to the program;

identifying a piece of the portion of the subsidiary data which corresponds to the elapsed time of a program; and providing the piece concurrently with the primary content data.

14. The machine-readable medium of claim 13, wherein the instructions for identifying a portion of the subsidiary data comprise instructions causing the machine to perform operations comprising accessing a database which stores a plurality of portions of the subsidiary data.

15. An entertainment system comprising:

a first data receiver to receive primary content data from a primary external source;

subsidiary data control logic to receive subsidiary data from a subsidiary external source, wherein the subsidiary data is independent of and supplementary to the primary content data;

a storage device to store the received subsidiary data;

a display device to display the primary content data;

a programming database control;

an electronic programming guide coupled to the programming database control;

synchronization logic operative to determine the identity of the primary content data currently displayed by determining the time and channel corresponding to the primary content data currently displayed and requesting a primary content data identifier from the programming database control based on the electronic program guide and determined time and channel; and storage/retrieval logic to determine whether subsidiary data supplementing the primary content data exists by accessing a storage database using the primary content data identity;

wherein the synchronization logic is operative to obtain the subsidiary data identified in the storage database for display and to provide the subsidiary data from the storage device to the display device synchronous to the primary content data.

16. The entertainment system of claim 15, further comprising:

reception logic to receive all of the subsidiary data corresponding to a program of the primary content data prior to beginning receipt of the program; and storage logic to control local storing of the subsidiary data corresponding to the program.

17. The entertainment system of claim 16, wherein the storage device comprises a local nonvolatile storage medium.

18. The entertainment system of claim 15, wherein the synchronization logic is further operative to:
- determine an elapsed time of a program of the primary content data;
- identify a portion of the subsidiary data in the storage device which corresponds to the program;
- retrieve a piece of the portion of the subsidiary data which corresponds to the elapsed time of the program from the storage device; and
- provide the retrieved piece to the display device synchronous to the elapsed time of the program.

19. The method of claim 1, wherein determining whether subsidiary data exists comprises accessing the electronic program guide using the determined time and channel.

20. The method of claim 1, wherein obtaining the subsidiary data comprises retrieving the subsidiary data from a memory of the entertainment system.

21. The method of claim 1, wherein obtaining the subsidiary data comprises retrieving the subsidiary data from a remote server.

22. The method of claim 1, wherein the subsidiary data comprises at least one of reference information regarding a program of the primary content data, biographical information regarding the actors, guests and participants of a program of the primary content data and advertisements.

23. The method of claim 1, wherein determining the identity of the primary content data is performed in response to a change in the primary content data currently displayed.

24. The machine-readable medium of claim 10, wherein the instructions for determining whether subsidiary data exists further comprise instructions causing the machine to perform operations comprising accessing the electronic program guide using the determined time and channel.

25. The machine-readable medium of claim 10, wherein the instructions for obtaining the subsidiary data further comprise instructions causing the machine to perform operations comprising retrieving the subsidiary data from a memory of the entertainment system.

26. The machine-readable medium of claim 10, wherein the instructions for obtaining the subsidiary data further comprise instructions causing the machine to perform operations comprising retrieving the subsidiary data from a remote server.

27. The machine-readable medium of claim 10, wherein the subsidiary data comprises at least one of reference information regarding a program of the primary content data, biographical information regarding the actors, guests and participants of a program of the primary content data and advertisements.

28. The machine-readable medium of claim 10, wherein the instructions for determining the identity of the primary content data are performed in response to a change in the primary content data currently displayed.

29. The entertainment system of claim 15, further comprising reception logic coupled to a remote server, wherein the storage database includes an identification of a remote server from which subsidiary data may be retrieved and wherein the synchronization logic is operative to request that the reception logic retrieve the subsidiary data from the identified remote server.

30. The entertainment system of claim 15, wherein the subsidiary data comprises at least one of reference information regarding a program of the primary content data, biographical information regarding the actors, guests and participants of a program of the primary content data and advertisements.

31. The machine-readable medium of claim 15, wherein the synchronization logic is operative to determine the identity of the primary content data in response to a change in the primary content data currently displayed.

32. The method of claim 1 wherein displaying the subsidiary data comprises displaying the subsidiary data synchronous to the primary content data.

33. The method of claim 10 wherein the instructions for displaying the subsidiary data comprise instructions causing the machine to perform operations comprising displaying the subsidiary data synchronous to the primary content data.

* * * * *